US010685178B2

(12) United States Patent
Singh et al.

(10) Patent No.: US 10,685,178 B2
(45) Date of Patent: Jun. 16, 2020

(54) DEFINING AND DELIVERING PERSONALIZED ENTITY RECOMMENDATIONS

(71) Applicant: ADOBE INC., San Jose, CA (US)

(72) Inventors: Harpreet Singh, Noida (IN); Harpreet Singh, Chandigarh (IN)

(73) Assignee: ADOBE INC., San Jose, CA (US)

( * ) Notice: Subject to any disclaimer, the term of this patent is extended or adjusted under 35 U.S.C. 154(b) by 32 days.

(21) Appl. No.: 15/935,579

(22) Filed: Mar. 26, 2018

(65) Prior Publication Data

US 2019/0294657 A1    Sep. 26, 2019

(51) Int. Cl.
*G06F 17/22*    (2006.01)
*G06F 40/197*   (2020.01)
*G06Q 30/06*    (2012.01)
*G06F 16/248*   (2019.01)
*G06F 16/958*   (2019.01)
(Continued)

(52) U.S. Cl.
CPC .......... *G06F 40/197* (2020.01); *G06F 16/248* (2019.01); *G06F 16/9535* (2019.01); *G06F 16/986* (2019.01); *G06F 40/14* (2020.01); *G06F 40/151* (2020.01); *G06F 40/221* (2020.01); *G06Q 30/0631* (2013.01); *G06Q 30/0643* (2013.01)

(58) Field of Classification Search
CPC ........................... G06F 17/2288; G06F 16/986
USPC ........................................................ 715/229
See application file for complete search history.

(56) References Cited

U.S. PATENT DOCUMENTS 10,050,849 B1 * 8/2018 Long ................... G06F 17/2247
2006/0248442 A1* 11/2006 Rosenstein ............. G06F 17/24
715/205

(Continued)

OTHER PUBLICATIONS

Chang, Kerry Shih-Ping, and Brad A. Myers. "WebCrystal: understanding and reusing examples in web authoring." In Proceedings of the SIGCHI Conference on Human Factors in Computing Systems, pp. 3205-3214. 2012. (Year: 2012).*

(Continued)

*Primary Examiner* — Frank D Mills
(74) *Attorney, Agent, or Firm* — Shook, Hardy & Bacon, L.L.P.

(57) ABSTRACT

Systems, methods, and computer-readable media are provided for defining personalized entity recommendations during a WYSWYG authoring experience and delivering such personalized entity recommendations. At the time of authoring, a user selects a baseline entity on a webpage where the personalized entity recommendation is to be delivered. A HTML DOM of the selected baseline entity is parsed into a plurality of HTML elements. Entity attributes associated with a recommended entity are mapped to the parsed HTML DOM generating an entity recommendation definition and the entity recommendation definition is presented enabling a user (e.g., a recommendation author) to update, edit, and/or approve the same. At runtime (i.e., at the time an entity recommendation is delivered), the HTML DOM of the selected baseline entity is cloned and the entity recommendation definition is utilized to populate entity attributes associated with the recommended entity into the HTML DOM creating a personalized entity recommendation. The personalized entity recommendation then is delivered to the destination webpage independent of the destination webpage characteristics.

20 Claims, 8 Drawing Sheets

(51) Int. Cl.
*G06F 16/9535* (2019.01)
*G06F 40/14* (2020.01)
*G06F 40/151* (2020.01)
*G06F 40/221* (2020.01)

(56) References Cited

U.S. PATENT DOCUMENTS

2014/0324943 A1* 10/2014 Antipa ................... H04L 67/42
709/203
2015/0154660 A1* 6/2015 Weald ................ G06Q 30/0277
705/14.73

* cited by examiner

```
1.    {
2.    Action: 'insertAfter',
3.         baseSelector: '"#carousle > DIV.a-row:eq(0) > DIV.a-carousel-
      viewport:eq(0) > OL.a-carousel:eq(0) > LI.a-carousel-card:eq(0)"',
4.         selector: '#recommended-product-for-you',
5.         attributes: [{
6.              action: 'setContent',
7.              selector: '.acs_product-title span',
8.              productAttribute: 'entity.title'
9.         }, {
10.             action: 'setAttribute',
11.             selector: '.acs_product-image img',
12.             attribute: 'src',
13.             productAttribute: 'entity.thumbnailUrl'
14.        }, {
15.             action: 'setContent',
16.             selector: '.acs_product-rating__review-count',
17.             attribute: 'src',
18.             productAttribute: 'entity.rating'
19.        }]
20.   }
```

FIG. 5

```
1.   {
2.       Recommendation: {
3.           action: 'insertAfter',
4.           baseSelector: '"#carousle > DIV.a-row:eq(0) > DIV.a-carousel-
     viewport:eq(0) > OL.a-carousel:eq(0) > LI.a-carousel-card:eq(0)"',
5.           selector: '#recommended-product-for-you',
6.           attributes: [{
7.               action: 'setContent',
8.               selector: '.acs_product-title span',
9.               attribute: 'title'
10.          }, {
11.              action: 'setAttribute',
12.              selector: '.acs_product-image img',
13.              attribute: 'src',
14.              attribute: 'thumbnailUrl'
15.          }, {
16.              action: 'setContent',
17.              selector: '.acs_product-rating__review-count',
18.              attribute: 'src',
19.              attribute: 'rating'
20.          }]
21.      },
22.      products: [{
23.          title: 'Vivo Y53 (Crown Gold) with Offers',
24.          thumbnailUrl: 'https://images-eu.ssl-images-amazonn.com/
     images/I/41h6DAqq8ML._SL150_.jpg',
25.          rating: 118
26.      }, {
27.          title: 'Gionee P7 Max (Gold)',
28.          thumbnailUrl: 'https://images-eu.ssl-images-amazon.com/
     images/I/4180P1Mwtl._SL150_.jpg',
29.          rating: 82
30.      }]
31.  }
```

FIG. 6

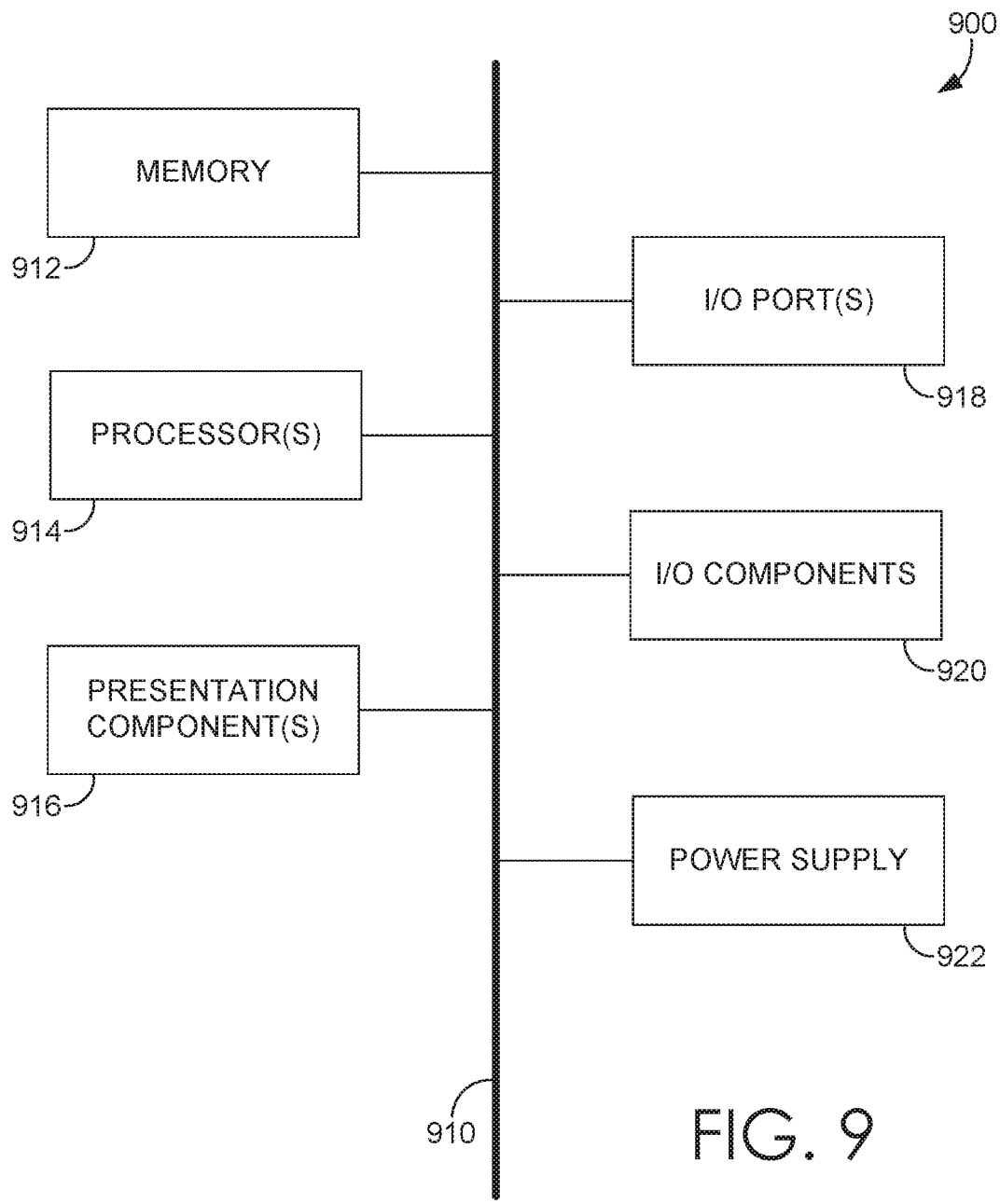

DEFINING AND DELIVERING PERSONALIZED ENTITY RECOMMENDATIONS

BACKGROUND

With the rapid growth of online marketing (e.g., e-marketing) and online sales (e.g., e-sales) used as tools to promote items of potential interest to viewers (e.g., potential customers), the need for web-based personalization of recommended entities in terms of defining customer-centric content and dynamic content delivery has increased. With the proliferation of various web frameworks and Internet browser platforms on which web-based personalized entity recommendations are consumed, authors of personalized entity recommendations (e.g., entity marketers, advertisers, promoters, and the like) desire to ensure the personalized recommendations they author can be easily presented across various web platforms and user devices, independent of characteristics of the destination webpage (i.e., the webpage on which a personalized recommendation is to be presented) such as structure, style, layout, view, and the like, in order to reach maximum viewership.

To cater to the increased demand for personalized entity recommendations, authors of such recommendations oftentimes use recommendation authoring systems to define and deliver recommendations personalized with regard to a target customer or potential customer. What You See is What You Get ("WYSWYG"), an authoring experience that enables authors to preview expected content output as the content is being generated, is one such authoring tool recommendation authors can use to define and deliver personalized entity recommendations.

SUMMARY

Embodiments of the present invention relate to, among other things, methods, systems, and computer-readable storage media for defining personalized entity recommendations during a WYSWYG authoring experience. In this regard, a baseline entity on a destination webpage can be selected as a foundation for generating entity recommendation definitions that can be utilized to generate personalized entity recommendations. Once a baseline entity is selected from a destination webpage, an identifier of the baseline entity can be recorded for use at the time a personalized entity recommendation is delivered. An intelligent WYSWYG recommendation authoring system in accordance with implementations of the present invention can parse the HTML document object model ("DOM") of the baseline entity into one or more HTML elements. One or more entity attributes associated with a recommended entity can be mapped to the parsed HTML DOM generating an entity recommendation definition. Entity attributes mapped to the parsed HTML DOM of the baseline entity can be derived from a catalog associated with the recommended entity, for instance, if the baseline and/or recommended entity is present in the entity catalog. Alternatively, entity attributes mapped to the parsed HTML DOM of the baseline entity can be determined via a heuristic approach, whereby attributes are mapped based on the mapping of HTML classes and elements, for instance, if the baseline and/or recommended entity is not present in the entity catalog. The entity recommendation definition then can be presented for editing, updating and/or approval.

Embodiments of the present invention further relate to, among other things, methods, systems, and computer-readable storage media for delivering personalized entity recommendations independent of characteristics of the destination webpage. Once an entity recommendation definition is completed, the entity recommendation definition is maintained at an edge server. At runtime, a delivery library can access the entity recommendation definition from the edge server, clone the HTML DOM of the baseline entity identified in the entity recommendation definition on the destination webpage and use the mapped entity attributes associated with the entity recommendation definition to populate entity attributes associated with the recommended entity into the cloned HTML DOM generating a personalized entity recommendation. The personalized entity recommendation then can be delivered for presentation in association with the destination webpage independent of destination webpage characteristics.

Advantageously, intelligent personalized entity recommendation authoring and delivery in accordance with some implementations of the present invention can alleviate the need to store entity recommendation templates on a recommendation server, eliminate the delivery of recommendation content from server to client, alleviate maintenance of recommendation templates, for instance, when the structure and/or style of a destination webpage changes, optimize content delivery, and reduce the cost of recommendation delivery by using already painted DOMs rather than injecting new HTML. Further, personalized entity recommendation and delivery in accordance with some implementations of the present invention reduces recommendation load time chances of flicker during delivery of entity recommendations, can work across different browsers and various web frameworks, and is not limited to desktop views but can be extended to mobile and other user device views.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 5 is a schematic representation of computer-readable instructions showing an entity recommendation definition, in accordance with some implementations of the present disclosure;

FIG. 6 is a schematic representation of computer-readable instructions showing a stored entity recommendation definition populated with entity attributes associated with a recommended entity, in accordance with some implementations of the present disclosure;

FIG. 9 is a block diagram of an exemplary computing environment suitable for use in accordance with some implementations of the present disclosure.

DETAILED DESCRIPTION

Figure 2:
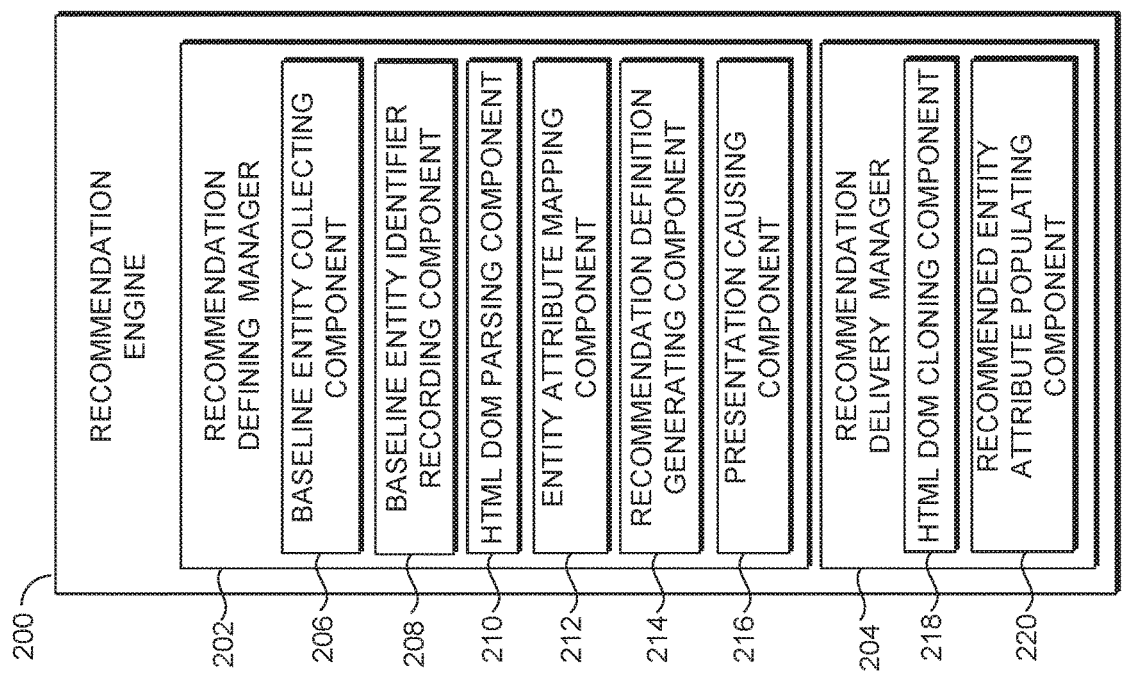
FIG. 2 is a block diagram depicting a recommendation engine, in accordance with some implementations of the present disclosure.

The subject matter of the present invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied when one or more features are present. Also, the term "or" includes the conjunctive, the disjunctive and both (a or b thus includes either a or b, as well as a and b).

Various terms are used throughout this description. Definitions of some terms are included below to provide a clearer understating of the ideas disclosed herein:

As used herein, the term "entity" refers to a product, good, service, and the like that may be offered, advertised, promoted, or suggested to target customers or potential customers. By way of example and not limitation, entities can include movies, videos, eBooks, music, clothing, electronics, moving services, cleaning services, cooking services, and the like.

As used herein, the term "personalized entity recommendation" refers to an entity offering, advertisement, promotion, suggestion, or the like that is tailored with regard to target customers and/or potential customers. Entity recommendations can be personalized with regard to target customers based on a variety of factors. By way of example only and not limitation, factors that may be used in determining which entity/entities to recommend can include, e.g., purchase history, brand preference, customer location, travel history, social network activity, and the like. Various algorithms are known to those having ordinary skill in the art for determining which entities to recommend to target customers (and/or potential customers) and, accordingly, such determination is not further described herein. In the context of e-marketing, personalized entity recommendations are entity offerings, advertisements, promotions, suggestions and the like that are tailored to target customers or potential customers and that are defined, delivered, and consumed electronically.

As used herein, the term "baseline entity" refers to an entity presented in association with a destination webpage that is selected by a recommendation author to be used as the foundation to generate entity recommendation definitions. By way of example only and not limitation, a baseline entity may be a particular mobile device featured among many other mobile devices located on a webpage detailing various mobile devices for sale by various manufacturers and mobile carriers.

As used herein, the term "entity recommendation definition" refers to the parsed HTML DOM elements of a baseline entity having attributes of a recommended entity mapped to at least a portion thereof. That is, an entity recommendation definition is the HTML DOM associated with a baseline entity having at least a portion of the corresponding HTML elements populated with an entity attribute of a recommended entity that corresponds to the appropriate attribute category. By way of example only, parsed HTML DOM containing a single computer-readable instruction that reads "entityAttribute: 'entity.title'" becomes an entity recommendation definition once an intelligent WYSWYG authoring system in accordance with some implementations of the present disclosure maps the title attribute of the recommended entity to the parsed HTML DOM, replacing "entityAttribute: 'entity.title'" with "attribute: 'title'". FIG. 5 is one example of a recommendation definition represented in JSON format. It will be understood by those having ordinary skill in the art that parsed HTML DOM may contain various numbers of entity attributes and the example provided herein is by way of illustration only. In aspects hereof, entity recommendation definitions are maintained at edge servers to be accessed at runtime (that is, when a personalized entity recommendation is to be delivered).

As used herein, the term "entity attribute" refers to a characteristic of an entity. By way of example only and not limitation, entity attributes may include an entity's image, title, price, height, width, weight, customer satisfaction rating, and the like.

As used herein, the term "destination webpage" refers to a webpage where a personalized entity recommendation is to be delivered. By way of example only and not limitation, a destination webpage may include any webpage on which a personalized recommendation author wishes to promote a personalized entity recommendation campaign. A destination webpage can include, by way of example only and not limitation, the homepage of a personalized browser, the footwear webpage of a shoe manufacturer's website, the checkout webpage of an online purchase and delivery service, or the FAQ section of a travel destination website.

As used herein, the term "destination webpage characteristic" refers to any one of the configuration, organization, and/or arrangement thereof. By way of example only and not limitation, a destination webpage characteristic can refer to the webpage's structure, style, layout, or view.

Personalized entity recommendations are generally authored for different purposes. For example, personalized entity recommendations may be authored to promote special offers regarding mobile devices and associated monthly data plans in an attempt to increase a mobile carrier's customer base. Personalized entity recommendations also may include an advertisement for particular clothing item or wearable technology from a department store presented to increase sales and/or awareness. Personalized entity recommendations further may encompass seasonal or regional promotions for various vacation and/or travel destinations during peak-season and during off-season. In preparing such personalized entity recommendations, an author (e.g., marketer) may wish to ensure their entity recommendation campaign reaches the maximum number of viewers, regardless of the web browser, network speed, and/or user devise on which a potential customer views the personalized entity recommendation.

Prior attempts have been made to create an authoring experience that easily and intuitively allows a marketer to define and deliver personalized entity recommendations to various browsers and across multiple web frameworks. These methods, however, have their limitations including large maintenance overhead, dependency on destination webpage developers each time a webpage's characteristics change, slow delivery runtime, and webpage flicker.

For example, some current recommendation definition and delivery systems retain the Hypertext Markup Language (HTML) content and destination webpage characteristics as part of the entity recommendation definition, thereby restraining the personalized recommendation to depend on the structure, style, layout and/or view of where specifically the personalized recommendation is being delivered (i.e., destination webpage). This method of personalized entity recommendation definition and delivery is further restrictive in that it requires entity recommendation authors to change the entity recommendation definition each time a change is made to one or more characteristics of the destination webpage.

It would be beneficial if entity recommendation authors had a recommendation generating tool that enabled them to define and deliver recommendation campaigns across multiple destination webpages and channels, to be viewed on various user devices with various network speeds, without redefining the personalized entity recommendation for each instance of the destination webpage and/or each user device.

Accordingly, embodiments described herein are directed to defining a personalized entity recommendation deliverable to a destination webpage independent of destination webpage characteristics. More generally, embodiments described herein are directed to defining a personalized entity recommendation by selecting a baseline entity on a destination webpage visible in an authoring mode during a WYSWYG authoring experience, recording an identifier of the baseline entity, parsing the HTML DOM associated with the baseline product into a plurality of HTML elements, mapping entity attributes associated with a recommended entity to the parsed HTML elements and generating an entity recommendation definition utilizing the identifier of the baseline entity and the mapped entity attributes. Entity attributes may be sourced from known entities in an entity catalog, or from unknown entities not present in an entity catalog by way of a heuristic approach. By way of example, if the entity is a product, the product attributes may be sourced from known products in a product catalog, or from unknown products not present in a product catalog by way of a heuristic approach.

By mapping entity attributes from already present entities in an entity catalog, or from unknown entities by way of a heuristic approach, the intelligent WYSWYG system can learn the entity attributes to HTML elements mapping over time. In other words and by way of example, if a product catalog is associated with a specific destination webpage, the product attributes once mapped can be reused, such as when a marketer defines additional personalized entity recommendations. In this regard, the intelligent WYSWYG system can learn from the stored attribute mapping to make the visual authoring experience for an author (e.g., marketer, promoter, advertiser, etc.) easier and more intuitive. Such machine learning methods are known and apparent to those having ordinary skill in the art to which the present disclosure pertains. Upon mapping entity attributes associated with a recommended entity to the parsed HTML DOM, the intelligent WYSWYG system can present the entity recommendation definition, enabling updating, editing, and/or approval thereof.

During delivery of a personalized entity recommendation, current personalization engines merge personalized content and an HTML template, and inject dynamic content onto the destination webpage as the page loads. Further, the HTML DOM rendering with current methods is not optimized since web browsers paint the personalized recommendation in its entirety rather than reusing existing HTML DOMs already rendered on the destination webpage. This increases the latency of the runtime recommendation delivery, in some cases causes flickering, and results in a poor and/or slow user experience for the personalized entity recommendation viewer.

Accordingly, embodiments described herein are directed to delivering a personalized entity recommendation independent of destination webpage characteristics. In this regard, embodiments described herein utilize an entity recommendation to clone, at runtime, the HTML DOM of a baseline entity on a destination webpage and populate the entity attributes associated with a recommended product, good, service, or the like into the cloned HTML DOM, thereby generating the personalized entity recommendation for presentation on the destination webpage. In operation, embodiments described herein leverage the browser capability of cloning already painted DOMs quickly and thereby reduce the likelihood of flicker and/or bad user experience frequently seen in other methods due to eliminating the need for complete replacement of HTML content at runtime.

Figure 1:
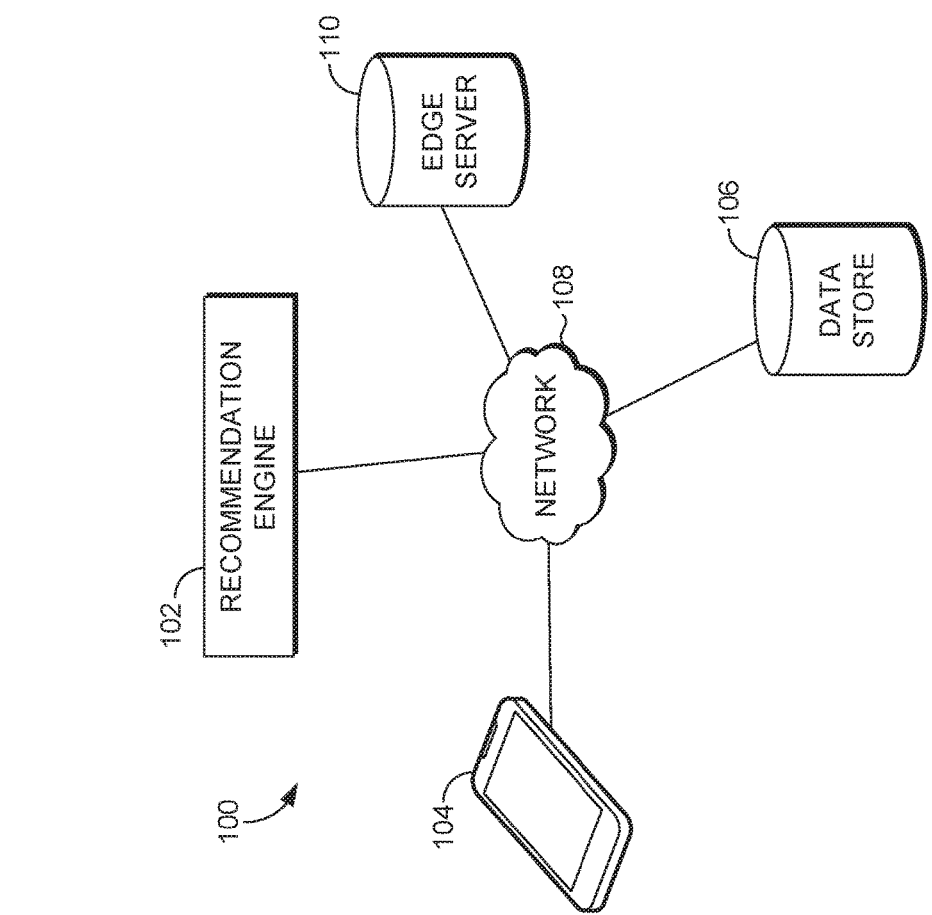
FIG. 1 is a schematic depiction of a system for facilitating authoring of personalized entity recommendations, in accordance with some implementations of the present disclosure.

Turning now to FIG. 1, a block diagram is provided illustrating an exemplary system 100 for authoring personalized entity recommendations in association with a destination webpage, independent of the characteristics thereof, in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

Among other components not shown, the system 100 includes a recommendation engine 102, a user device 104, a data store 106, and an edge server 110. It should be understood that the system 100 shown in FIG. 1 is an example of one suitable architecture for implementing certain aspects of the present disclosure. Each of the components shown in FIG. 1 may be implemented via one or more computing devices, such as computing device 900 described with reference to FIG. 9, for example. It should be noted that implementations of the present disclosure are equally applicable to mobile computing devices and devices accepting gesture, touch, and/or voice input. Any and all such variations, and any combination thereof, are contemplated to be within the scope of implementations of the present disclosure.

As shown in FIG. 1, the recommendation engine 102 and the user device 104 may communicate with each other via a network 108, which may include, without limitation, one or more local area networks (LANs) and/or wide area networks (WANs). Such networking environments are commonplace in offices, enterprise-wide computer networks, intranets, and the Internet. Accordingly, the network 108 is not further described herein. It should be understood that any number of recommendation engines and/or user devices may be employed within the system 100 within the scope of implementations of the present disclosure. Each may comprise a single device or multiple devices cooperating in a distributed environment. For instance, the recommendation engine 102 could be provided by multiple server devices collectively providing the functionality of the recommendation engine 102 as described herein. Additionally, other components not shown also may be included within the network environment.

The recommendation engine 102 has access to at least one data store or repository 106 that includes data specific to a plurality of products, goods, and/or services. In implementations of the present disclosure, the data store is configured to be searchable for one or more of the items stored in association therewith. It should be understood that the information stored in association with the data store may be configurable and may include any information relevant to, by way of example only, entity catalogs that contain known entities and their associated entity attributes (e.g., image, title, customer satisfaction rating, price, height, width, weight, and the like) that may be used, for example, to replace existing entity attributes in cloned HTML DOMs. As described in more detail below, the data store 106 may include entity catalogs containing entities related to the electronic, fashion, automotive, education, and sports industries, or the like, and/or metadata associated therewith. Such entity catalog and entity attribute data may be stored in the data store 106 and accessible to any component of the system 100. The content and volume of such information are not intended to limit the scope of aspects of the present technology in any way. Further, the data store 106 may be a single, independent component (as shown) or a plurality of storage devices, for instance, a database cluster, portions of which may reside in association with the recommendation engine 102, another external computing device (not shown), and/or any combination thereof. Additionally, the data store 106 may include a plurality of unrelated data repositories or sources within the scope of embodiments of the present technology.

The data store also may be updated at any time, including an increase or decrease in the amount of entity catalog and entity attribute data relevant to any given personalized entity recommendation campaign or an increase or decrease in the amount of entity catalog and entity attribute data irrelevant to any given personalized entity recommendation campaign.

The recommendation engine 102 has access to at least one edge server 110 which maintains completed entity recommendation definitions. In implementations of the present disclosure, the edge server is configured to receive a completed entity recommendation definition from a recommendation engine, such as recommendation engine 200 of FIG. 2 and maintain the entity recommendation definition. At runtime, a delivery library can access the entity recommendation definition from the edge server, clone the HTML DOM of the baseline entity identified in the entity recommendation definition on the destination webpage, and use the entity attributes associated with the entity recommendation definition to populate entity attributes associated with the recommended entity into the cloned HTML DOM generating a personalized entity recommendation. The personalized entity recommendation then can be delivered for presentation in association with the destination webpage independent of destination webpage characteristics. The content and volume of such entity recommendation definitions are not intended to limit the scope of aspects of the present technology in any way. Further, the edge server 110 may be a single, independent component (as shown) or a plurality of servers. Additionally, the edge server 110 may include a plurality of unrelated information within the scope of embodiments of the present technology.

Generally, the system 100 is configured to facilitate the authoring of personalized entity recommendations during a WYSWYG authoring experience deliverable independent of destination webpage characteristics (e.g., structure, style, layout, view, and the like). At a high-level, HTML DOM of a selected baseline entity located on a destination webpage is parsed into a plurality of HTML elements. Entity attributes associated with a recommended entity are mapped to the parsed HTML DOM, thereby creating, in association with an identifier of the baseline entity, an entity recommendation definition. A visual representation of the mapped entity attributes is presented for manual editing, updating, and/or approval. The entity recommendation definition is maintained on an edge server for use at runtime. At runtime, delivery libraries clone the HTML DOM of the selected baseline entity on the destination webpage, and, using the entity recommendation definition maintained at the edge server, populate the cloned HTML DOM with the entity attributes of the recommended entity. In this regard, populating the cloned HTML DOM with the entity attributes of the recommended entity replaces already existing entity attributes contained within the cloned HTML DOM, thereby delivering the personalized entity recommendation to the destination webpage independent of the webpage characteristics of the destination webpage.

Returning to FIG. 1, in operation, the user device 104 is configured to access the recommendation engine 102 over the network 108 (e.g., a LAN or the Internet). For instance, the user device 104 may be configured to provide and/or receive data from the recommendation engine 102 via the network 108. The user device 104 may be any computing device that is capable of facilitating a user to select a baseline entity. An identifier of the selected baseline entity can be recorded so that the same can be used to generate an entity recommendation definition which can, in turn, be utilized to recall the identity of the baseline entity at the time of personalized entity recommendation delivery. Any type of user interface may be used to facilitate selection of the baseline entity. In some cases, a user may select a baseline entity, for example, by clicking on the entity presented on a destination webpage while in an authoring mode.

The user device 104 further may be configured to obtain and present an entity recommendation definition, or portion thereof, for editing, updating and/or approval. In this regard, an entity recommendation definition generated in response to selecting a baseline entity, recording an identifier of the selected baseline entity, and mapping entity attributes to the parsed HTML DOM of the baseline entity to generate an entity recommendation definition can be provided to the user device for display to a user (e.g., via a browser or application installed on the user device 104).

In some cases, the user device 104 accesses the recommendation engine 102 via a web browser, terminal, or standalone PC application operable on the user device. The user device 104 might be operated by an administrator, which may be an individual(s) that manages content associated with a document, a website, an application, or the like.

For instance, a user may be any individual, such as a marketer, publisher, or advertiser associated with an entity attempting to define and deliver a personalized entity recommendation campaign (e.g., via the Internet). While only one user device 104 is illustrated in FIG. 1, multiple user devices associated with any number of users may be utilized to carry out embodiments described herein. The user device 104 may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, the user device 104 may include one or more processors, and one or more computer-readable media. The computer-readable media may include computer-readable instructions executable by the one or more processors.

The recommendation engine 102 generally is configured to define personalized entity recommendations during a WYSWYG authoring experience and deliver the same independent of destination webpage characteristics. In particular, the recommendation engine 102 is configured to receive selection of baseline entities, record identifiers of the selected baseline entities, parse the HTML DOM of selected baseline entities, map entity attributes associated with recommended entities the parsed HTML DOM of selected baseline entities, generate entity recommendation definitions utilizing the recorded baseline entity identifiers and the mapped entity attributes, and deliver personalized entity recommendations to destination webpages independent of destination webpage characteristics. In implementation, and at a high-level, the recommendation engine 102 is configured to receive an indication of a user-selected baseline entity from a destination webpage while in an entity recommendation authoring mode. In embodiments, the recommendation engine 102 is configured to record an identifier of the selected baseline entity so that the same can be used at time of delivery of an entity recommendation. The recommendation engine 102 further is configured to parse the HTML DOM of the selected baseline entity and map entity attributes from a desired recommended known or unknown entity to the parsed HTML DOM. Still further, the recommendation engine 102 is configured to generate entity recommendation definitions utilizing the recorded baseline entity identifiers and the corresponding parsed HTML DOM. The recommendation engine 102 further is configured to visually present entity recommendation definitions for updating, editing, and/or approval. In implementation (and as more fully described below), at runtime, a delivery library clones the HTML DOM of a selected baseline entity on the destination webpage and, utilizing a corresponding entity recommendation definition, populates the mapped entity attributes contained within the entity recommendation definition onto the HTML DOM of the cloned baseline entity, thereby delivering the personalized entity recommendation to the destination webpage independent of webpage characteristics.

An exemplary recommendation engine 200 is provided in FIG. 2. As shown in FIG. 2, the recommendation engine 200 includes a recommendation defining manager 202, and a recommendation delivery manager 204. The recommendation defining manager 202 generally is configured to facilitate the defining of a personalized entity recommendation. The recommendation delivery manager 204 generally is configured to deliver a personalized entity recommendation to a destination webpage. Advantageously, such a personalized entity recommendation definition and delivery process enables personalized entity recommendations to be delivered to a destination webpage independent of the destination webpage characteristics.

Although illustrated as separate components of the recommendation engine 200, any number of components can be used to perform the functionality described herein. Further, although illustrated as being a part of a recommendation engine, the components can be distributed via any number of devices. For example, the recommendation defining manager 202 can be provided via one device, server, or cluster of servers, while the recommendation delivery manager 204 can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As described, the recommendation defining manager 202 generally is configured to facilitate the defining of personalized entity recommendations. As illustrated, the recommendation defining manager 202 includes a baseline entity collecting component 206, a baseline entity identifier recording component 208, a HTML DOM parsing component 210, an entity attribute mapping component 212, a recommendation definition generating component 214, and a presentation causing component 216. Although illustrated as separate components of the recommendation defining manager 202, any number of components can be used to perform the functionality described herein.

The baseline entity collecting component 206 is configured to collect or obtain an indication of a user-selected baseline entity from a destination webpage while the associated recommendation system (e.g., system 100 of FIG. 1) is in an authoring mode. As described, a baseline entity can be any advertised, offered, or promoted item on a destination webpage, but is not exclusive to those items, goods, and/or services. A baseline entity may be collected or obtained in any manner. In some cases, a baseline entity is selected by a user of the recommendation engine 200, such as a marketer, advertiser, or promoter. In this regard, a marketer or set of marketers might select a baseline entity, for example, via a graphical user interface accessible by way of an application on a user device. As an example, a marketer might select a baseline entity via user device 104 of FIG. 1 that is connected to the network 108.

The baseline entity identifier recording component 208 is configured to record identifiers associated with selected baseline entities. In this regard, once a baseline entity is selected as the foundation for generating a personalized entity recommendation, the baseline entity identifier recording component 208 records the identifier of the baseline entity (as part of the entity recommendation definition, as more fully described below) so that the same can be used at the time of personalized recommendation delivery.

The HTML DOM parsing component 210 is configured to parse the HTML DOM of a selected baseline entity into a plurality of HTML elements. In embodiments, a selected baseline entity can be parsed to obtain its HTML DOM. In that regard, the HTML DOM parsing component 210 deconstructs the user-selected baseline entity into its document object model tree structure such that each object or HTML element in the DOM tree may be addressed and manipulated.

The entity attribute mapping component 212 is configured to map entity attributes onto the parsed HTML DOM. In embodiments, the entity attribute mapping component 212 maps entity attributes to the HTML elements of the parsed HTML DOM of the user-selected baseline entity based on information available in an entity catalog and/or heuristics. In particular, the mapped entity attributes can originate from known entities located in an entity catalog within a data store, such as data store 106 of FIG. 1, or from unknown entities using a heuristic approach wherein attributes can be mapped to the parsed HTML DOM based on mapping of HTML classes and elements, and the same can be reused by the entity attribute mapping component 212 while defining further recommendations on the same or related webpages.

By way of example, if a marketer selects a product present in a product catalog, such as a product catalog located within a data store (such as data store 106 of FIG. 1), then all or some of the attributes can be reverse mapped to the parsed HTML DOM based on values in the parsed HTML DOM. Further, by way of example only and not limitation, for a product not present in the product catalog, attributes can be mapped to the parsed HTML DOM of the baseline product such that an H2 tag for a product with class "title" maps to product title within the parsed HTML DOM, and an IMG tag maps to the parsed HTML DOM of the baseline product to be used as a thumbnail.

As can be appreciated, selection of known and unknown entities can happen in various ways. In some embodiments, the personalized entity recommendation author (e.g., marketer, advertiser, promoter, or the like) can select which entities to map onto the parsed HTML DOM. In other embodiments, entities may be selected using various known recommendation algorithms, a combination of known algorithms, or algorithms or combinations of algorithms currently unknown in the art.

The entity recommendation definition generating component 214 is configured to utilize the baseline entity identifiers and attributes for recommended entities that are mapped to the HTML DOM of particular baseline entity identifiers to generate entity recommendation definitions. As more fully described below, the entity recommendation definitions generated by the entity recommendation definition generating component 214 may be utilized to generate personalized entity recommendations in association with destination webpages.

The presentation causing component 216 is configured to cause presentation of the personalized entity recommendation definition for editing, updating, and/or approval. In some cases, the presentation causing component 216 causes presentation of a personalized entity recommendation definition that does not require editing and/or updating. In other cases, the presentation causing component 216 causes presentation of personalized entity recommendation definitions that need editing and/or updating. In embodiments, once entity attributes are mapped to the parsed HTML DOM of the user-selected baseline entity, the presentation causing component 216 causes presentation of the HTML DOM with the mapped entity attributes. Advantageously, a marketer can then edit and/or update the attribute mapping and/or approve the attribute mapping visually to complete the entity recommendation definition.

As described, the recommendation delivery manager 204 is generally configured to deliver personalized entity recommendations to destination webpages by cloning the HTML DOM of selected baseline entities on a destination webpage and populating the cloned HTML DOM with an entity recommendation definition. As illustrated, the recommendation delivery manager 204 includes an HTML DOM cloning component 218, and a recommended entity attribute populating component 220. Although illustrated as separate components of the recommendation delivery manager 204, any number of components can be used to perform the functionality described herein.

The HTML DOM cloning component 218 is configured to clone the HTML DOM of selected baseline entities on destination webpages. In this regard, the HTML DOM cloning component 218 is configured to clone the HTML DOM of a selected baseline entity on a destination webpage such that populating the entity attributes utilizing the entity recommendation definition can occur, thereby delivering the personalized entity recommendation onto the destination webpage.

The recommended entity attribute populating component 220 is configured, at runtime, to populate the cloned HTML DOM of the selected baseline entity on a destination webpage with the entity attributes contained within the entity recommendation definition defined by the recommendation defining manager 202. In particular, the recommended entity attribute populating component 220 is configured to, at runtime, access the entity recommendation definition and utilize the entity recommendation definition to populate the recommended entity attributes into the cloned HTML DOM of the baseline entity on the destination webpage thereby delivering the personalized entity recommendation onto the destination webpage.

Figure 3:
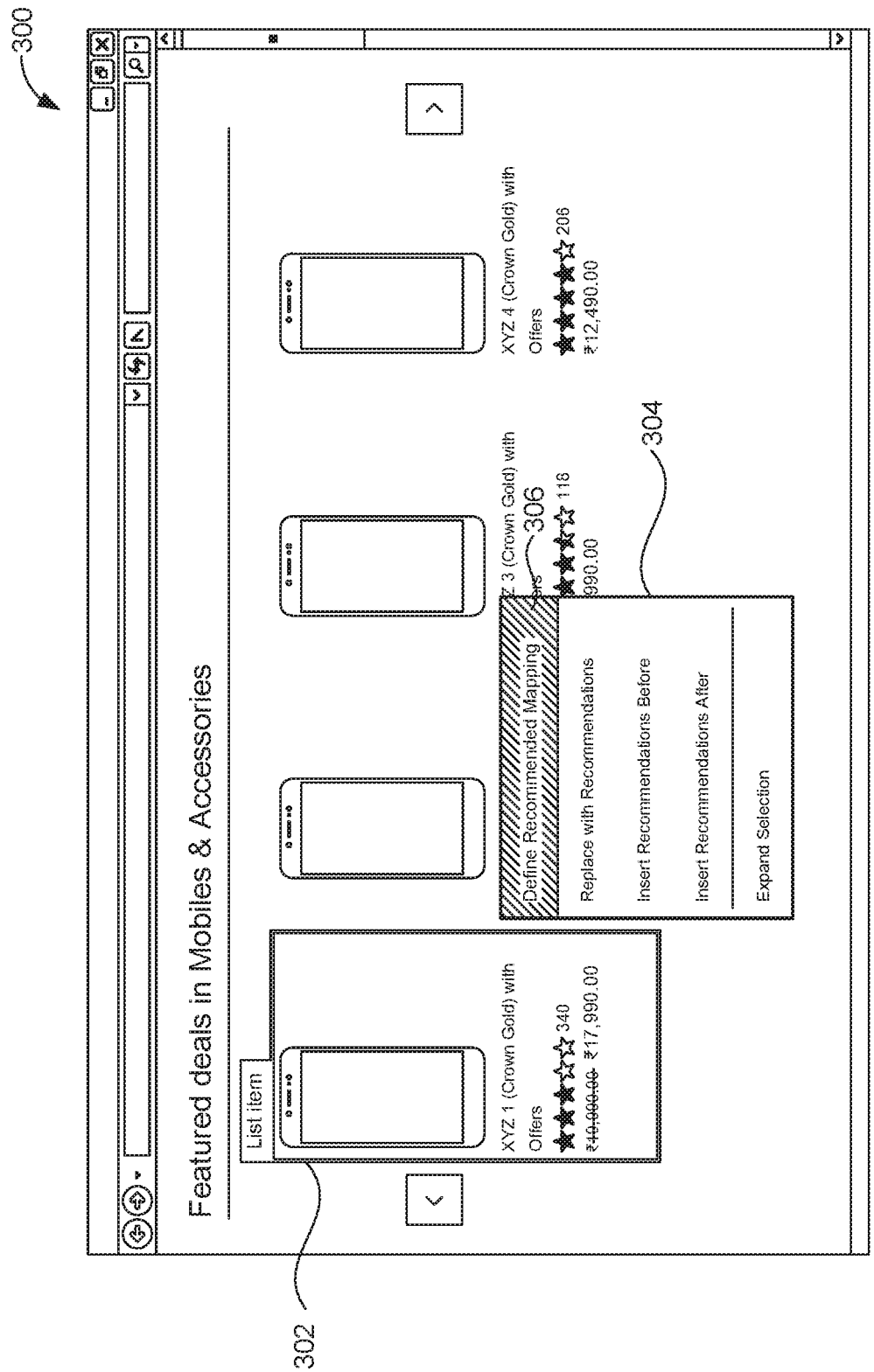
FIG. 3 is a schematic diagram showing an exemplary user interface illustrating a baseline entity selection in association with a destination webpage, in accordance with some implementations of the present disclosure.

Now turning to FIG. 3, a user interface display illustrating a representation of baseline entity selection by a user on a destination webpage is shown, in accordance with embodiments of the present invention. In embodiments, the user interface display 300 is one example of many user interface displays that include user interface elements that allow for the selection of a baseline entity for use in authoring personalized entity recommendations. In particular, the user interface display 300 is a representation of a baseline entity selection in an authoring mode during a WYSWYG authoring experience. The user interface display portion 302 represents a selected baseline entity. Upon selecting the baseline entity, at user interface display portion 304, a menu appears providing the user with options and functionalities an intelligent WYSWYG authoring system in accordance with embodiments hereof can perform. It should be appreciated that the options and functionalities presented at user interface display portion 304 are in no way limiting, and that various other options and functionality can be presented. In operation, once a baseline entity is selected, a user interface portion, such as user interface display portion 304, can be presented showing various options and functionalities, including, by way of example only, "define recommendation mapping," "replace with recommendations," "insert recommendations before," "insert recommendations after," and "expand selection." At user interface display portion 306, an option and/or functionality is selected to be performed by the intelligent WYSWYG authoring system.

Figure 4:
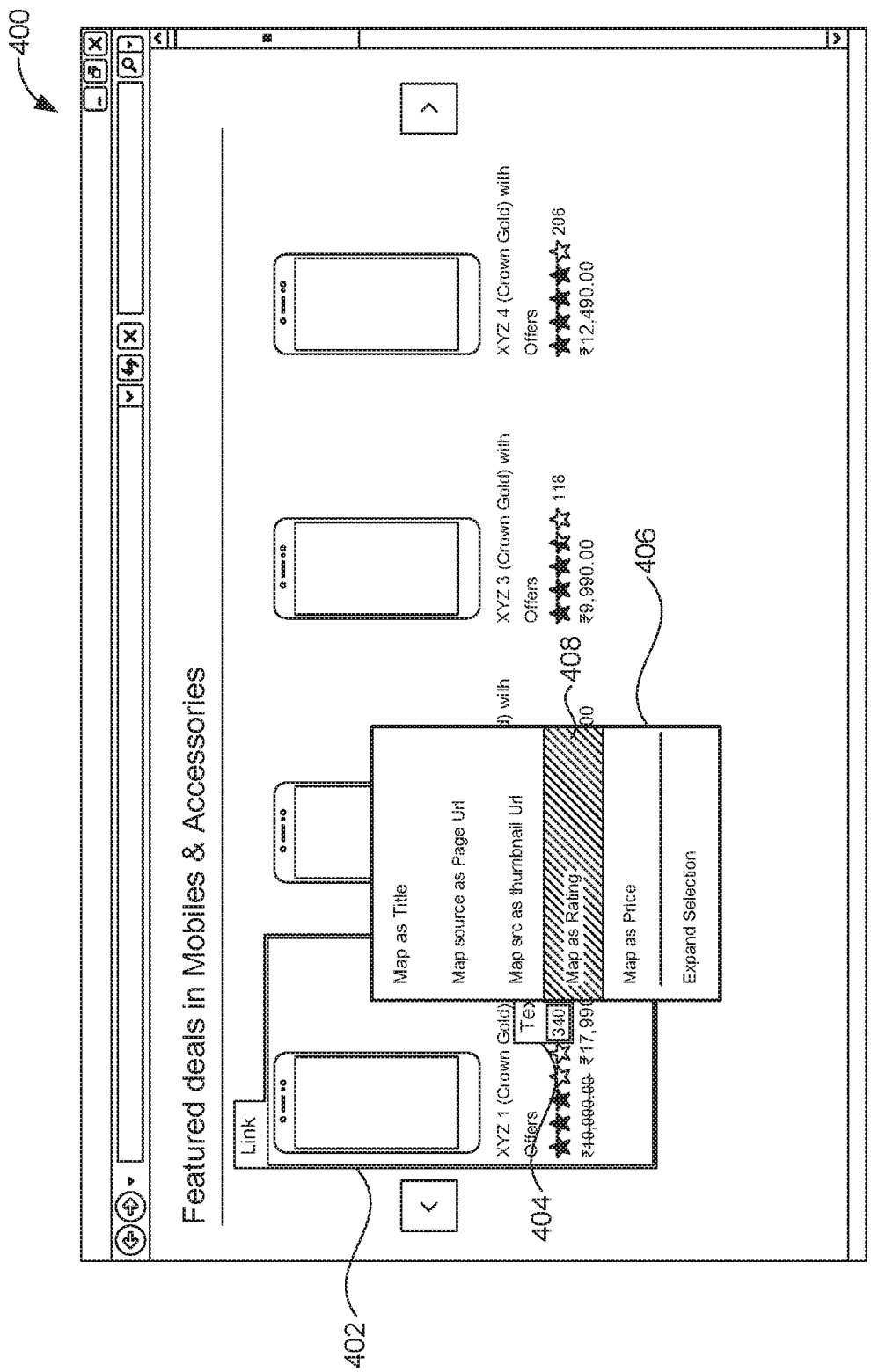
FIG. 4 is a schematic diagram showing an exemplary user interface illustrating attributes associated with a recommended entity, the attributes capable of being mapped to a HTML DOM, in accordance with some implementations of the present disclosure.

Now turning to FIG. 4, a user interface display illustrating a representation of attributes of a selected baseline entity that can be mapped, in accordance with embodiments of the present invention, is shown. In embodiments, the user interface display 400 is one example of many user interface displays that include user interface elements that present a selected baseline entity, the entity attributes associated with the baseline entity, and how they can be mapped via an intelligent WYSWYG authoring system, in accordance herewith. In operation, a baseline entity can be selected, and within that baseline entity attributes can be selected and directed with respect to where they are to be mapped. The user interface display portion 402 represents a selected baseline entity. Upon baseline entity selection, attributes of the selected baseline entity can be selected, as represented at user interface display portion 404. Once the attribute is selected, a user interface display portion 406 illustrating a menu can be presented providing the user with options as to how the entity attribute should be mapped. It should be appreciated that the options and functionalities displayed at user interface display portion 406 are in no way limiting, and that various other options and functionalities can be presented. In operation, once a baseline entity attribute is selected, a user interface portion, such as user interface display portion 406, can be presented showing various options and functionalities including, by way of example only, "map as title," "map source as page url," "map src as thumbnail url," "map as rating," "map as price," and "expand selection." At user interface display portion 406, an option and/or functionality is selected to be performed by the intelligent WYSWYG authoring system in accordance with embodiments of the present invention.

Now turning to FIG. 5, a schematic representation of computer-readable instructions showing a stored entity recommendation definition in JSON format, in accordance with embodiments of the present invention is shown. In embodiments, computer-readable instructions 500 are generated and stored by a recommendation engine within an intelligent WYSWYG authoring system, such as recommendation engine 200 of FIG. 2. The computer-readable instructions 500 represent one example of a stored entity recommendation definition. At line 8 of the computer-readable instructions 500, an intelligent WYSWYG authoring system via an entity attribute mapping component, such as the entity attribute mapping component 212 of FIG. 2, maps the title attribute of a known or unknown entity to be recommended. At line 13 of the computer-readable instructions 500, an intelligent WYSWYG authoring system via an entity attribute mapping component, such as the entity attribute mapping component 214 of FIG. 2, maps the 'thumbnailUrl' attribute of a known or unknown entity to be recommended. At line 18 of the computer-readable instructions 500, an intelligent WYSWYG authoring system via an entity attribute mapping component, such as the entity product attribute mapping component 212 of FIG. 2, maps the rating attribute of a known or unknown entity to be recommended.

It should be appreciated that computer-readable instructions 500 are just one example of a stored entity recommendation, and entity attributes that can be mapped to the stored entity recommendation from known or unknown recommended entities can include more, fewer, the same, or different entity attributes. By way of example only, the computer-readable instructions 500 include the title, 'thumbnailUrl,' and rating attributes. In other stored recommendations, title, 'thumbnailUrl,' and rating attributes may or may not be included, and other attributes may be included including, but not limited to, image, price, height, width, and weight attributes, and the like.

Now turning to FIG. 6, a schematic representation of computer-readable instructions showing a stored entity recommendation definition populated with recommended entity attributes in JSON format, in accordance with embodiments of the present invention, is shown. In embodiments, the computer-readable instructions 600 are generated and stored by a recommendation engine within a WYSWYG authoring system, such as the recommendation engine 200 of FIG. 2. The computer-readable instructions 600 represent one example of an entity recommendation definition populated with recommended entity attributes ready for delivery to a destination webpage. At line 9 of the computer-readable instructions 600, an intelligent WYSWYG authoring system via a recommended entity attribute populating component, such as the recommended entity attribute populating component 220 of FIG. 2, populates the title entity attribute of a recommended entity into the stored entity recommendation. At line 14 of the computer-readable instructions 600, an intelligent WYSWYG authoring system via a recommended entity attribute populating component, such as the recommended entity attribute populating component 220 of FIG. 2, populates the 'thumbnailUrl' entity attribute of a recommended product into the stored entity recommendation. At line 19 of the computer-readable instructions 600, an intelligent WYSWYG authoring system via a recommended entity attribute populating component, such as the recommended entity attribute populating component 220 of FIG. 2, populates the rating entity attribute of a recommended entity into the stored entity recommendation. Lines 22 through 29 of the computer-readable instructions 600 are representations of potential recommended entities from which a recommended entity attribute mapping component maps recommended entity attributes.

It should be appreciated that computer-readable instructions 600 are just one example of a stored entity recommendation definition populated with recommended entity attributes. By way of example only, the computer-readable instructions 600 include the title, 'thumbnailUrl,' and rating attributes mapped from a recommended entity via a recommended entity attribute mapping component, such as the recommended entity attribute mapping component 220 of FIG. 2. In other entity recommendation definitions, title, 'thumbnailUrl,' and rating attributes may or may not be mapped, as well as other entity attributes such as image, price, height, width, and weight attributes, and the like may or may not be mapped.

Figure 7:
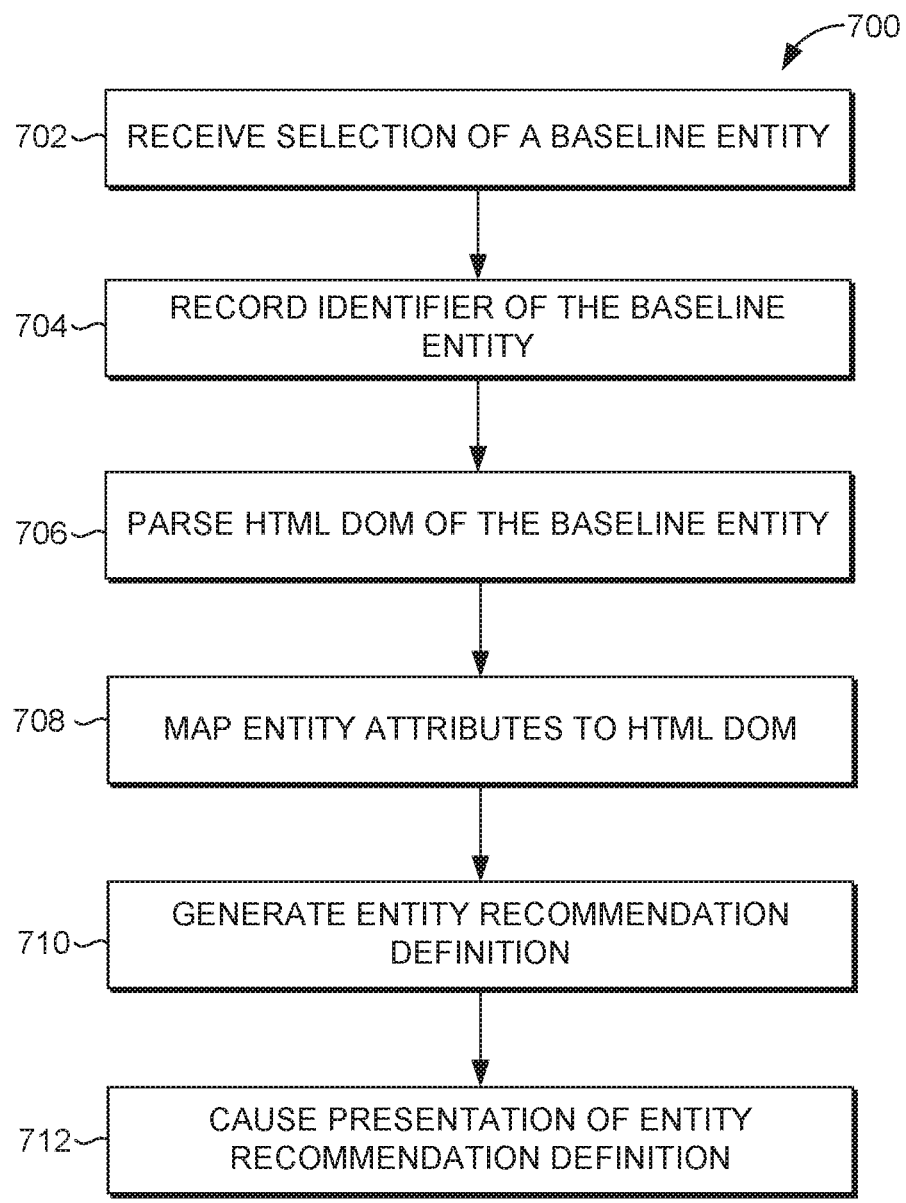
FIG. 7 is flow diagram showing an exemplary method for defining a personalized entity recommendation, in accordance with some implementations of the present disclosure.

Now turning to FIG. 7, a flow diagram is illustrated showing an exemplary method 700 for defining personalized entity recommendations deliverable to destination webpages independent of destination webpage characteristics, in accordance with embodiments of the present invention. In embodiments, the method 700 is performed by a recommendation engine, such as recommendation engine 200 of FIG. 2. Initially, as indicated at block 702, a selection of a baseline entity associated with a destination webpage is received. A baseline entity may be in the form of a product, good, service, or item related to various industries, including automotive, fashion, technology, sports, or education. The baseline entity includes an associated HTML DOM. As indicated at block 704, an identifier associated with the selected baseline entity is recorded. At block 706, the HTML DOM of a selected baseline entity is parsed into a plurality of HTML elements. As indicated at block 708, one or more entity attributes associated with a recommended entity are mapped to at least a portion of the HTML elements to generate an entity recommendation definition. Stated differently, at block 708, entity attributes are mapped to the HTML DOM used to generate the entity recommendation definition. At block 710, an entity recommendation definition is generated utilizing the mapped one or more attributes and the identifier of the selected baseline entity. At block 712, presentation of the entity recommendation is caused enabling a user to edit, update, and/or approve the personalized entity recommendation definition for delivery onto the destination webpage.

Figure 8:
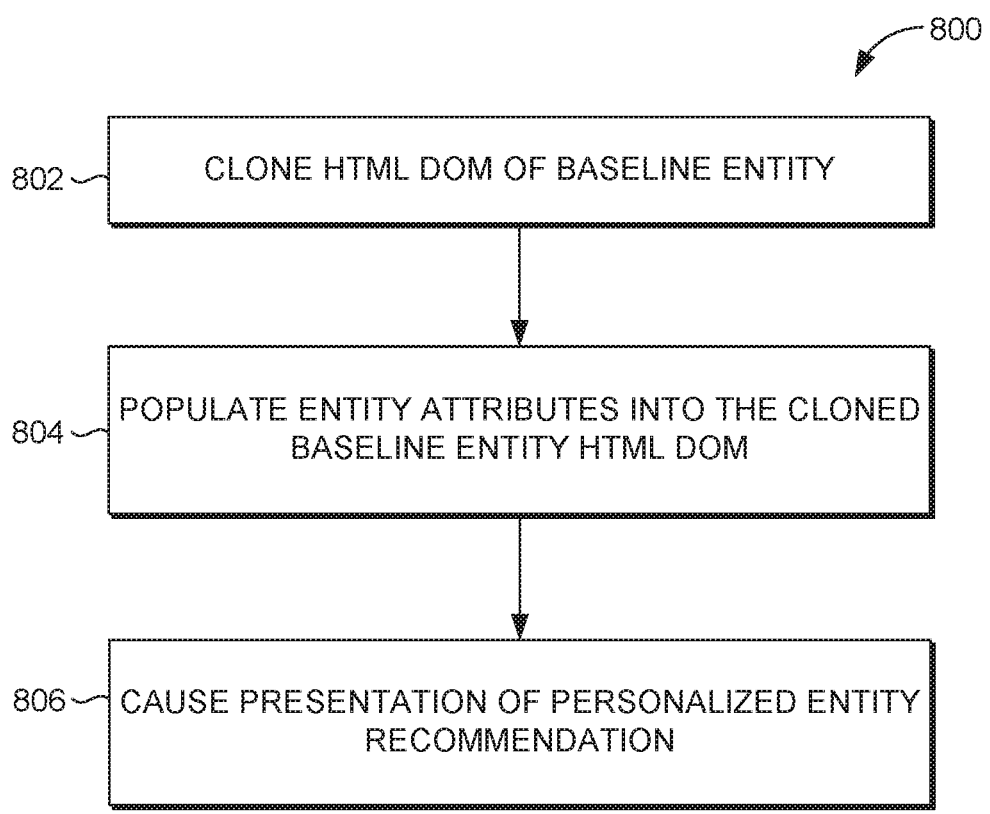
FIG. 8 is flow diagram showing an exemplary method for delivering a personalized entity recommendation, in accordance with some implementations of the present disclosure.

Now turning to FIG. 8, a flow diagram is illustrated showing an exemplary method 800 for delivering personalized entity recommendation definitions onto a destination webpage independent of destination webpage characteristics, at runtime. In embodiments, the method 800 is performed by a recommendation engine, such as recommendation engine 200 of FIG. 2. Initially, and as indicated at block 802, the HTML DOM of a selected baseline entity identified by an entity recommendation definition and located on the destination webpage is cloned. As indicated at block 804, utilizing an entity recommendation definition, one or more entity attributes associated with a recommended entity are populated into the cloned HTML DOM of the baseline entity to generate a personalized entity recommendation. As indicated at block 806, presentation of the personalized entity recommendation is caused in association with the destination webpage independent of destination webpage characteristics.

Having briefly described an overview embodiments of the present invention, an exemplary operating environment in which at least exemplary embodiments of the present invention may be implemented is described below in order to provide a general context for various aspects of the present invention. Referring to FIG. 9, an exemplary operating environment for implementing embodiments of the described technology is shown and designated generally as computing device 900. The computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 9, the computing device 900 includes a bus 910 that directly or indirectly couples the following devices: a memory 912, one or more processors 914, one or more presentation components 916, one or more input/output (I/O) ports 918, one or more input/output components 920, and an illustrative power supply 922. The bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

The computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

The I/O ports 918 allow computing device 900 to be logically coupled to other devices including I/O components 920, some of which may be built in. Illustrative I/O components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, aspects of the present invention provide systems, methods, and computer-readable storage media for authoring personalized entity recommendations. In this regard, a user selects a baseline entity on a webpage where a personalized entity recommendation is to be delivered. An identifier of the baseline entity is recorded. A HTML DOM of the selected baseline entity is parsed into a plurality of HTML elements. Entity attributes associated with a recommended entity are mapped to the HTML elements of the parsed HTML DOM. An entity recommendation definition is generated utilizing the baseline entity identifier and the mapped entity attributes. The entity recommendation definition is presented enabling a user to update, edit, and/or approve the same. Aspects of the present invention further provide systems, methods, and computer-readable storage media for delivering personalized entity recommendations. In this regard, at the time a personalized entity recommendation is to be delivered, the HTML DOM of the selected baseline entity is cloned and the entity recommendation definition is utilized to populate entity attributes associated with the recommended entity into the cloned HTML DOM creating a personalized entity recommendation. The personalized entity recommendation then is delivered to the destination webpage independent of the destination webpage characteristics.

Some specific embodiments of the invention have been described, which are intended in all respects to be illustrative rather than restrictive. Alternative embodiments will become apparent to those of ordinary skill in the art to which the present invention pertains without departing from its scope.

Certain illustrated embodiments hereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 700 of FIG. 7 and 800 of FIG. 8 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A computer-implemented method for defining personalized entity recommendations, the method comprising:
   receiving a selection of a baseline entity presented in association with a destination webpage, wherein the baseline entity is presented when the destination webpage is in a recommendation authoring mode, the baseline entity having an associated HTML DOM;
   recording an identifier of the baseline entity;
   parsing the HTML DOM of the baseline entity into a plurality of HTML elements;
   mapping one or more attributes associated with a recommended entity to at least a portion of the plurality of HTML elements;
   generating an entity recommendation definition utilizing the mapped one or more attributes associated with the recommended entity and the identifier of the baseline entity;
   utilizing the entity recommendation definition, cloning the HTML DOM of the baseline entity presented in association with the destination webpage in an authoring mode;
   utilizing the entity recommendation definition, populating the one or more attributes associated with the recommended entity into the cloned HTML DOM of the baseline entity at the destination webpage to generate a personalized entity recommendation by replacing one or more attributes associated with the baseline entity with the one or more attributes associated with the recommended entity, wherein the cloned HTML DOM of the baseline entity that is populated with the one or more attributes associated with the recommended entity is inserted into the destination webpage at a location specified in the recommendation authoring mode; and
   causing presentation of the personalized entity recommendation in association with the destination webpage.

2. The method of claim 1, wherein the selected baseline entity is associated with the destination webpage.

3. The method of claim 1, wherein the selected baseline entity is presented in association with the recommendation authoring mode.

4. The method of claim 1, wherein the entity recommendation definition is generated during a What You See is What You Get ("WYSWYG") recommendation authoring experience.

5. The method of claim 1, wherein the entity recommendation definition is maintained as an entity at an edge server.

6. The method of claim 1, wherein at least a portion of the one or more attributes associated with the recommended entity are derived from an entity catalog.

7. The method of claim 6, wherein the entity catalog is specific to a website associated with the destination webpage.

8. The method of claim 1, wherein at least a portion of the one or more attributes associated with the recommended entity are determined based on heuristics.

9. The method of claim 1, further comprising:
   receiving one or more changes to the mapping of the one or more attributes associated with the recommended entity to at least the portion of the plurality of HTML elements; and
   updating the entity recommendation definition in accordance with the one or more changes.

10. The method of claim 1, wherein the entity recommendation definition is in JSON format.

11. One or more computer storage media storing computer-useable instructions that, when executed by one or more computing devices, cause the one or more computing devices to perform a method for delivering personalized entity recommendations, the method comprising, at runtime:
   cloning a HTML DOM of a baseline entity identified by an entity recommendation definition, wherein the baseline entity is associated with a destination webpage in an authoring mode;

utilizing the entity recommendation definition, populating one or more entity attributes associated with a recommended entity into the cloned HTML DOM of the baseline entity at the destination webpage to generate a personalized entity recommendation, wherein the cloned HTML DOM of the baseline entity that is populated with the one or more entity attributes associated with the recommended entity is inserted into the destination webpage at a location specified in the authoring mode; and causing presentation of the personalized entity recommendation in association with the destination webpage.

12. The one or more computer storage media of claim 11, wherein populating the one or more entity attributes associated with the recommended entity into the cloned HTML DOM comprises replacing entity attribute data associated with the baseline entity in the cloned HTML DOM with entity attribute data associated with the recommended entity.

13. The one or more computer storage media of claim 11, wherein causing presentation of the personalized entity recommendation in association with the destination webpage is independent of one or more structural characteristics associated with the destination webpage.

14. The one or more computer storage media of claim 11, wherein causing presentation of the personalized entity recommendation in association with the destination webpage is independent of one or more style characteristics associated with the destination webpage.

15. The one or more computer storage media of claim 11, wherein the entity recommendation definition is in JSON format.

16. A computer system for implementing a WYSWYG authoring experience for personalized entity recommendations, the computer system comprising:

one or more hardware processors and memory configured to provide computer program instructions to the one or more hardware processors;

a personalized recommendation defining manager that, utilizing the one or more hardware processors:

(1) receives a selection of a baseline entity presented in association with a destination webpage, wherein the selected baseline entity is presented when the destination webpage is in an authoring mode;

(2) records an identifier of the baseline entity;

(3) parses an HTML DOM of the baseline entity into a plurality of HTML elements;

(4) maps one or more entity attributes associated with a recommended entity to at least a portion of the plurality of HTML elements, wherein the mapped entity attributes are based on at least one of attributes derived from an entity catalog and attributes determined based on heuristics; and (5) generates an entity recommendation definition utilizing the mapped one or more entity attributes and the identifier of the baseline entity; and a personalized recommendation delivery component that, utilizing the one or more hardware processors, at runtime:

(1) utilizing the entity recommendation definition, clones the HTML DOM of the baseline entity, wherein the baseline entity is presented in association with the destination webpage;

(2) utilizing the entity recommendation definition, populates one or more entity attributes associated with a recommended entity into the cloned HTML DOM of the baseline entity at the destination webpage to generate a personalized entity recommendation by replacing the one or more entity attributes associated with the baseline entity with one or more entity attributes associated with a recommended entity, wherein the cloned HTML DOM of the baseline entity that is populated with the one or more entity attributes associated with the recommended entity is inserted into the destination webpage at a location specified in the authoring mode; and (3) causes presentation of the personalized entity recommendation in association with the destination webpage.

17. The computer system of claim 16, wherein the personalized recommendation defining manager causes presentation of the entity recommendation definition in association with the destination webpage.

18. The computer system of claim 17, wherein the personalized recommendation defining manager receives one or more changes to the mapping of the one or more entity attributes associated with the recommended entity to at least the portion of the plurality of HTML elements, and wherein the personalized recommendation defining manager further updates the entity recommendation definition in accordance with the one or more changes.

19. The computer system of claim 16, wherein the entity recommendation definition is in JSON format.

20. The computer system of claim 16, wherein the entity recommendation definition is maintained at an edge server.

* * * * *